US011994046B2

(12) United States Patent
Ichihara et al.

(10) Patent No.: US 11,994,046 B2
(45) Date of Patent: May 28, 2024

(54) LOWER LINK OF INTERNAL COMBUSTION ENGINE

(71) Applicant: NISSAN MOTOR CO., LTD., Yokohama (JP)

(72) Inventors: Hiroki Ichihara, Kanagawa (JP); Tomoya Tojo, Kanagawa (JP); Kensuke Ikehara, Kanagawa (JP); Takashi Tanabe, Kanagawa (JP); Katsutoshi Nakamura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/026,307

(22) PCT Filed: Sep. 15, 2020

(86) PCT No.: PCT/IB2020/000771

§ 371 (c)(1),
(2) Date: Oct. 9, 2023

(87) PCT Pub. No.: WO2022/058766

PCT Pub. Date: Mar. 24, 2022

(65) Prior Publication Data

US 2024/0035401 A1 Feb. 1, 2024

(51) Int. Cl.

*F01M 1/06* (2006.01)
*F02B 75/32* (2006.01)
*F02B 75/04* (2006.01)

(52) U.S. Cl.

CPC ............... *F01M 1/06* (2013.01); *F02B 75/32* (2013.01); *F01M 2001/066* (2013.01); *F02B 75/045* (2013.01)

(58) Field of Classification Search

CPC .... F01M 1/06; F01M 2001/066; F01M 11/02; F01M 1/00; F02B 75/045; F02B 75/32
See application file for complete search history.

(56) References Cited

U.S. PATENT DOCUMENTS

2014/0053797 A1* 2/2014 Tanabe ..................... F01M 1/06 123/196 CP
2018/0171839 A1* 6/2018 Watanabe ............. F02B 75/045
2021/0071553 A1* 3/2021 Sugimoto ................. C23C 8/20

FOREIGN PATENT DOCUMENTS

JP 2016-196888 A 11/2016

* cited by examiner

*Primary Examiner* — Syed O Hasan
(74) *Attorney, Agent, or Firm* — Foley & Lardner LLP

(57) ABSTRACT

A lower link (6) is provided with an oil hole (30) in a crank pin bearing portion (11) in order to supply a jet of oil to a connecting portion between an upper pin (4) and an upper link (3). Oil hole (30) is composed of a first oil hole (31) linearly extending from the inner peripheral surface of crank pin bearing portion (11) outwardly in the radial direction, and a second oil hole (32) linearly extending from the outer surface of lower link (6) so as to intersect a distal end portion of first oil hole (31). An inclination angle (θ) of first oil hole (31) with a divided surface (14) set as a reference becomes relatively small, and hence the position of an oil inlet (31*b*) involving a problem of stress concentration becomes closer to divided surface (14) exhibiting a relatively low stress. Consequently, the stress concentration at oil inlet (31*b*) is alleviated.

6 Claims, 9 Drawing Sheets

LOWER LINK OF INTERNAL COMBUSTION ENGINE

TECHNICAL FIELD

The present invention relates to the improvement of a lower link composing a multi-link piston crank mechanism for an internal combustion engine.

BACKGROUND TECHNOLOGY

As a conventional technology in which a multi-link piston crank mechanism connects between a crank pin and a piston pin of a reciprocation type internal combustion engine, one described in a patent document 1 previously proposed by the present applicants has been publicly known. This multi-link piston crank mechanism includes an upper link connected to a piston pin of a piston, a lower link which connects the upper link with a crank pin of a crankshaft, and a control link of which one end is swingably supported on the engine body side and the other end is connected to the lower link. Then, the upper link and the lower link are rotatably connected to each other via an upper pin, and the control link and the lower link are rotatably connected to each other via a control pin.

Such a lower link in the multi-link piston crank mechanism receives combustion pressure, which is received by the piston, from the upper pin via the upper link, and transmits force to the crank pin by motion like leverage with the control pin as a fulcrum.

In the patent document 1, there is disclosed a configuration in which an oil hole for injecting lubricating oil to the outside when it meets an oil hole on the crank pin side is formed through a crank pin bearing portion, which is fitted to a crank pin, along a substantially radial direction. The lubricating oil injected from the oil hole lubricates the bearing portion between the upper pin and the upper link.

When the moving direction of the piston is up and down direction, a combustion load is input to the upper pin of one end of the lower link toward the down direction, and the reaction force of the combustion load acts on the control pin of the other end of the lower link toward the down direction similarly. Then, the reaction force of the combustion load acts on the crank pin bearing portion to which the crank pin positioned between the upper pin and the control pin is fitted, toward the substantially up direction. By such a load input, a large stress as tensile stress or bending stress is concentrated at the opening edge on the crank pin side of the oil hole formed through the crank pin bearing portion. Therefore, the opening on the crank pin side of the oil hole is a weak point on the strength of the lower link, and an increase in the output of the internal combustion engine having a multi-link piston crank mechanism is limited.

PRIOR ART REFERENCE

Patent Document

Patent Document 1: Japanese Patent Application Publication 2016-196888

SUMMARY OF THE INVENTION

A lower link according to the present invention is provided with an oil hole for supplying lubricating oil from an oil supply hole of a crank pin toward the connecting portion between an upper pin and a upper link, and the oil hole is composed of a first oil hole linearly extending from the inner peripheral surface of a crank pin bearing portion outwardly in the radial direction, and a second oil hole linearly extending so as to intersect a distal end portion of the first oil hole and having one end opened to the outer surface of the lower link as an oil outlet.

In other words, the oil hole of the lower link is formed in a substantially L shape formed by combining the first oil hole and the second oil hole each having a liner shape. The lubricating oil supplied from the crank pin is injected and supplied to the connecting portion between the upper pin and the upper link, which is a lubrication object, through the first oil hole and the second oil hole.

In such a configuration, as compared with case where an oil hole having a simple liner shape is formed from the crank pin side toward the connecting portion between the upper pin and the upper link which is a lubrication object, the angle of the inclination of the first oil hole opened to the inner peripheral surface of the crank pin bearing portion can be relatively small (that is, it is inclined in the direction away from a piston). The circumferential distribution of stress generated at the crank pin bearing portion by the above-mentioned load input becomes mostly large in an area in a direction from the center of the crank pin toward the piston, and by reducing the inclination angle of the first oil hole, the opening position of the first oil hole becomes a part at which stress is relatively small.

Accordingly, the stress concentration at the opening edge of the oil hole in the crank pin bearing portion that becomes a weak point in the strength of the lower link is alleviated, with advantageous for securing the strength of the lower link and for increasing in output of the internal combustion engine.

MODE FOR IMPLEMENTING THE INVENTION

In the following, one embodiment of the present invention will be explained in detail based on the drawings.

Figure 1:
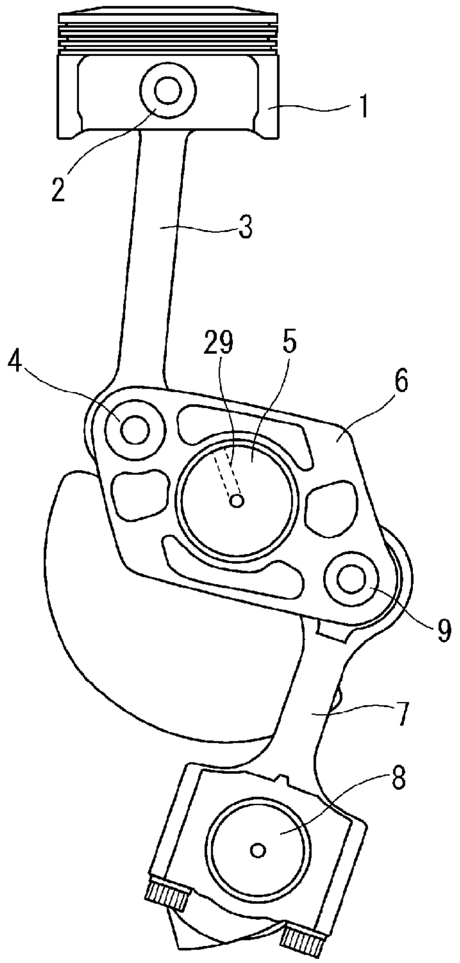
FIG. 1 is an illustrative view for explaining the configuration of a multi-link piston crank mechanism in one embodiment.

In FIG. 1, there is shown a component element of a multi-link piston crank mechanism to which the present invention is applied. This multi-link piston crank mechanism itself has been publicly known, for example, by the above-mentioned patent document 1, and is provided with an upper link 3 having one end connected to a piston 1 via a piston pin 2, a lower link 6 connected to the other end of upper link 3 via an upper pin 4 and connected to a crank pin 5 of a crankshaft, and a control link 7 for regulating the freedom degree of lower link 6. One end of control link 7 is swingably supported on a supporting pin 8 on the engine body side, and the other end is connected to lower link 6 via a control pin 9. In addition, the multi-link piston crank mechanism can be configured as a variable compression ratio mechanism by making the position of supporting pin 8 variable.

Figure 2:
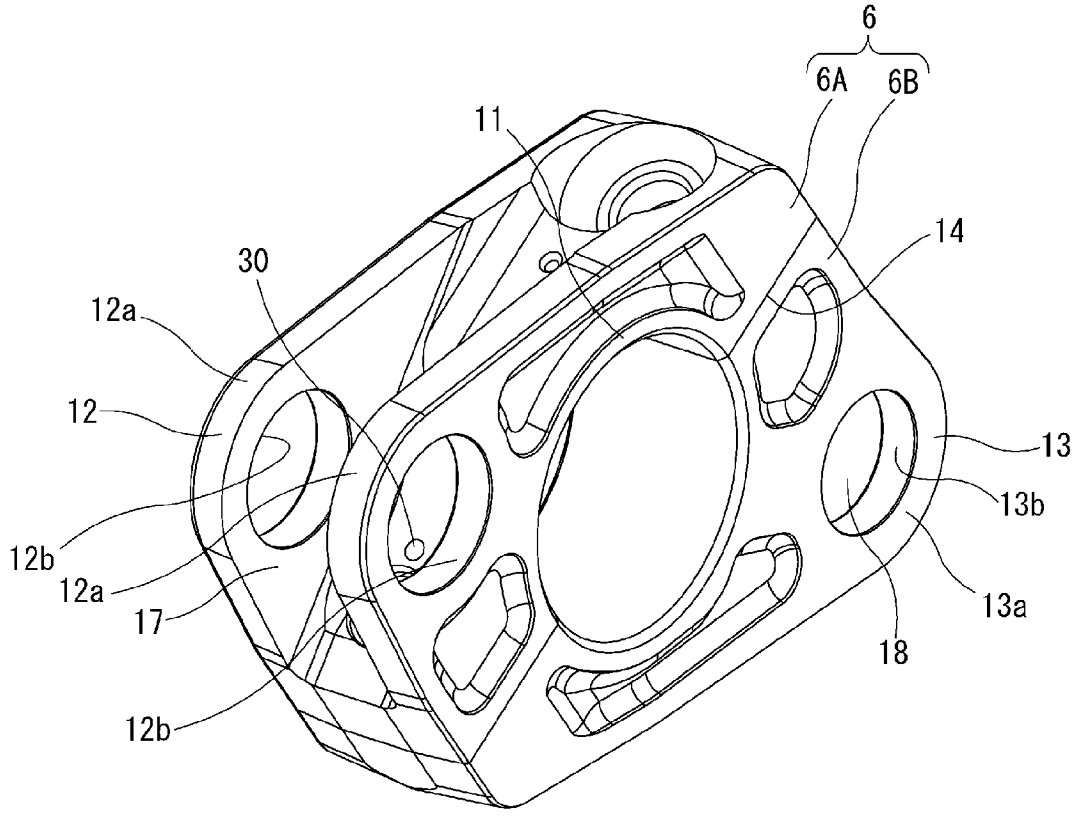
FIG. 2 is a perspective view of a lower link in a first embodiment.
Figure 3:
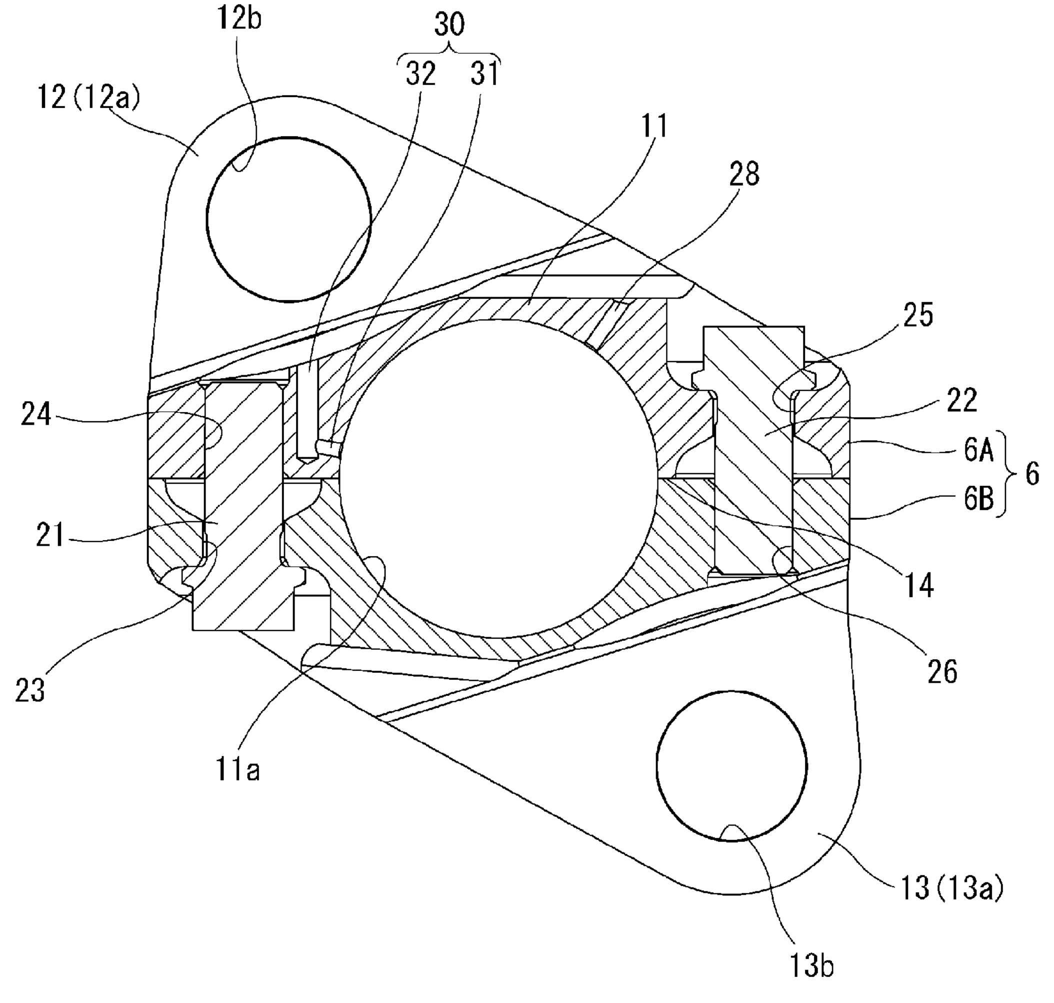
FIG. 3 is a sectional view of the lower link in the first embodiment.

As shown in FIG. 2 and FIG. 3, lower link 6 includes, in the middle thereof, a cylindrical crank pin bearing portion 11 which is fitted to crank pin 5, and a pin boss portion 12 for an upper pin and a pin boss portion 13 for a control pin, and upper-pin pin boss portion 12 is disposed at a position on the side opposite to control-pin pin boss portion 13 by approximately 180° with crank pin bearing portion 11 sandwiched therebetween. Lower link 6 as a whole has a shape of a parallelogram similar to a rhombus, and is formed of two parts of a lower link upper 6A having upper-pin pin boss portion 12 and a lower link lower 6B having control-pin pin boss portion 13 by being divided at a divided surface 14 passing through the center of crank pin bearing portion 11. These lower link upper 6A and lower link lower 6B are fastened to each other by two bolts 21 and 22 positioned at respective both sides of crank pin bearing portion 11, after crank pin bearing portion 11 is fitted to crank pin 5 via the after-mentioned bearing metal 16. Two bolts 21 and 22 each extend in the direction orthogonal to divided surface 14, and bolt center lines of bolts 21 and 22 are parallel to each other. In addition, bolt 21 positioned on the upper-pin pin boss portion 12 side passes through a bolt hole 23 on the lower link lower 6B side, and is screwed to a screw hole 24 on the lower link upper 6A side. Bolt 22 positioned on the control-pin pin boss portion 13 side passes through a bolt hole 25 on the lower link upper 6A side, and is screwed to a screw hole 26 on the lower link lower 6B side.

Upper-pin pin boss portion 12 and control-pin pin boss portion 13 are formed in bifurcated shapes so as to sandwich upper link 3 and control link 7 in the middle part in the axial direction, and a pair of bearing flange portions 12*a* and a pair of bearing flange portions 13*a* respectively supporting upper pin 4 and control pin 9 extend along the end surfaces in the axial direction of lower link 6. That is, bearing flange portions 12*a* and 13*a* respectively forming pin boss portions 12 and 13 are connected to the end portions in the axial direction of crank pin bearing portion 11 having a cylindrical shape. Bearing flange portions 12*a* and 13*a* have circular through holes 12*b* and 13*b* respectively, and cylindrical end portions of upper pin 4 and control pin 9 are press-fitted into through holes 12*b* and 13*b* respectively. Then, upper link 3 and control link 7 are swingably moved in groove portions 17 and 18 respectively which are formed between a pair of bearing flange portions 12*a* and between a pair of bearing flange portions 13*a* respectively.

Figure 5:
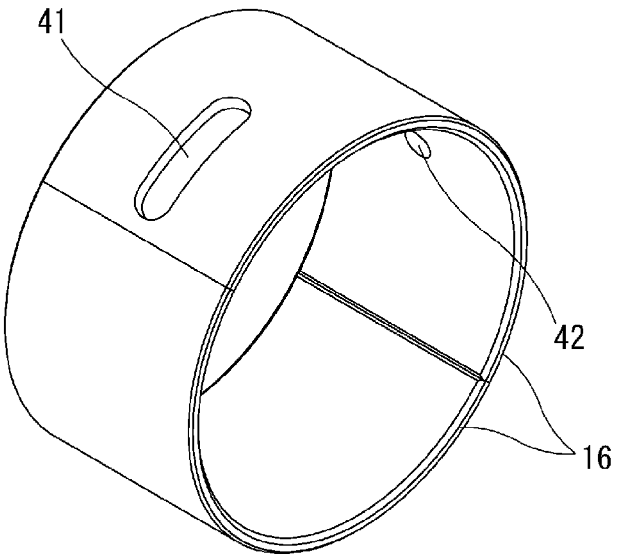
FIG. 5 is a perspective view of a bearing metal.
Figure 6:
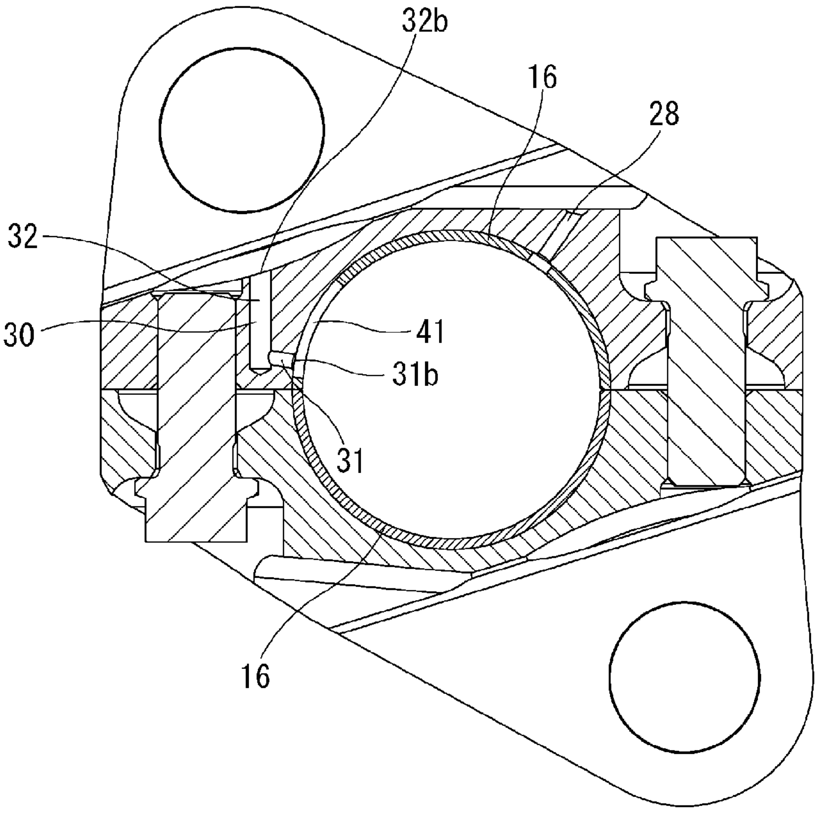
FIG. 6 is a sectional view of the lower link in the first embodiment in which the bearing metal is incorporated.

Crank pin bearing portion 11 is fitted to crank pin 5 via a pair of semi-cylindrical bearing metals 16 (see FIG. 5 and FIG. 6). Crank pin 5 is provided with, in the inside thereof, a lubrication oil passage to which pressurized lubricating oil is supplied, and a distal end portion of the lubrication oil passage extending in the radial direction is opened to the outer peripheral surface of crank pin 5 as an oil supply hole 29 (see FIG. 1). As will be mentioned below, an oil hole 30 is formed through crank pin bearing portion 11, and when oil hole 30 meets oil supply hole 29 on the crank pin 5 side, lubricating oil is injected from oil hole 30 as oil jet.

Combustion load acts on upper-pin pin boss portion 12 from upper link 3 via upper pin 4, and lower link 6 swings with control pin 9 as a fulcrum so as to transmit force to crank pin 5 by motion like leverage. Consequently, the combustion load acts on upper-pin pin boss portion 12 in the lower direction in FIG. 1 and combustion reaction force acts on control-pin pin boss portion 13 in the lower direction in FIG. 1 similarly. On the other hand, reaction force from crank pin 5 acts on the vicinity of the center of crank pin bearing portion 11 in the upper direction in FIG. 1, and consequently, a large stress is generated around crank pin bearing portion 11 of lower link upper 6A. The circumferential distribution of stress of crank pin bearing portion 11 becomes maximum in an area in a direction from the center of crank pin 5 toward piston 1, more specifically, in an area in a direction slightly close to upper pin 4. On the other hand, in an area close to divided surface 14 of crank pin bearing portion 11, stress becomes relatively small.

Figure 4:
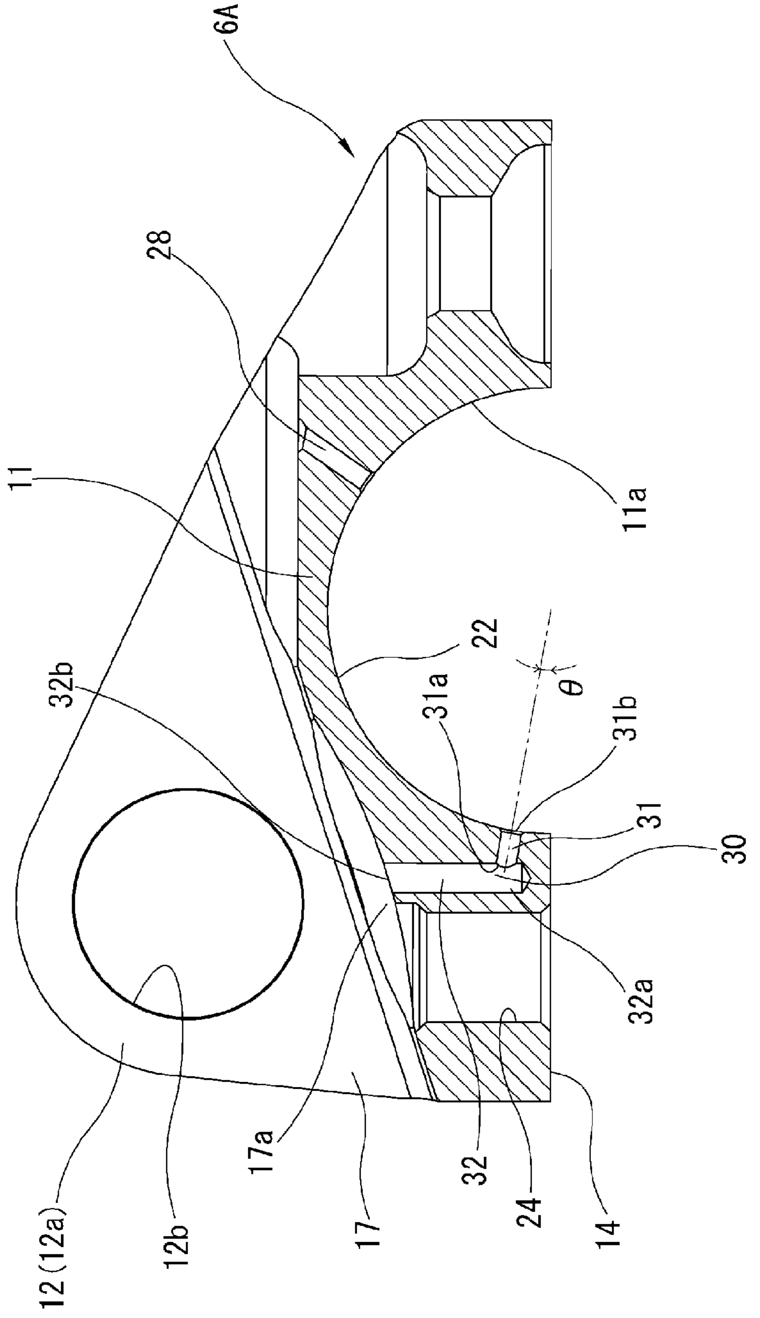
FIG. 4 is a sectional view of a lower link upper in the first embodiment.

In FIG. 4, there is shown a sectional view of lower link upper 6A (sectional view along a surface orthogonal to the axial direction of crank pin 5) in which an oil hole 30 in a first embodiment is provided to crank pin bearing portion 11.

Oil hole 30 is formed to lubricate the connecting portion of upper link 3 connected to lower link 6 in upper-pin pin boss portion 12, namely, the sliding surface between upper link 4 and upper link 3, and is formed in a substantially L shape by a first oil hole 31 and a second oil hole 32.

First oil hole 31 is a non-through hole (that is, a distal end 31*a* is sealed) linearly extending from an inner peripheral surface 11*a* of crank pin bearing portion 11 outwardly in the radial direction, and the base end is opened to inner peripheral surface 11*a* of crank pin bearing portion 11 as an oil inlet 31*b*. In one embodiment, first oil hole 31 is obliquely inclined with respect to divided surface 14, and is formed along the radial line of crank pin bearing portion 11. In this way, by arranging first oil hole 31 along the radial line of crank pin bearing portion 11, oil inlet 31*b* is opened in a form of substantially true circle.

In addition, the inclination angle of first oil hole 31 (for example, an inclination angle $\theta$ of first oil hole 31 with divided surface 14 set as a reference) in lower link 6 is set so as to be relatively small, to avoid being positioned in an area where stress is high in the above-mentioned circumferential distribution of stress of crankpin pin bearing portion 11. In the illustrated first embodiment, inclination angle $\theta$ of first oil hole 31 with divided surface 14 set as a reference is 10°. In this way, since inclination angle $\theta$ is small, first oil hole 31 is formed such that the extension line of the center line of first oil hole 31 extends in a direction not intersecting the outer peripheral surface of upper pin 4. Specifically, the extension line of the center line of first oil hole 31 passes through the lower side of upper pin 4 (opposite side of piston 1).

Second oil hole 32 is a non-through hole (that is, a distal end 32*a* is sealed) linearly extending from the outer surface of lower link 6 to the inside of lower link 6. Specifically, it extends from a bottom surface 17*a* of a groove portion 17 facing upper pin 4 to the inside of lower link 6, and the base end of second oil hole 32 is opened to bottom surface 17*a* as an oil outlet 32*b*. In the inside of lower link 6, the distal end portion of second oil hole 32 (that is, a portion on the distal end 32*a* side) and the distal end portion of first oil hole 31 (that is, a portion on the distal end 31*a* side) intersect each other. That is, second oil hole 32 communicates with first oil hole 31.

Second oil hole 32 is formed such that the extension line of the center line of second oil hole 32 extends in a direction intersecting the outer peripheral surface of upper pin 4, and, in the illustration, it is directed to the vicinity of the center of upper pin 4. In addition, in the illustrated embodiment, second oil hole 32 extends along the direction orthogonal to divided surface 14, so as to be parallel to the center axial line of bolt 21 adjacent thereto and screw hole 24 corresponding to bolt 21. In this way, since second oil hole 32 extends parallel to screw hole 24 adjacent thereto, the thickness therebetween is fixed in the axial direction, and it is possible to suppress the occurrence of partial thinning and partially lowering of strength.

First oil hole 31 and second oil hole 32 are formed along one plane orthogonal to the axial direction of crank pin 5. For example, first oil hole 31 and second oil hole 32 are positioned on the plane passing through the middle of the dimension in the axial direction of crank pin bearing portion 11. In addition, in the present invention, although first and second oil holes 31 and 32 may be formed in an oblique direction so as to have angles to the plane slightly, it is desirable to formed them along the plane in order to secure the strength in oil inlet 31*b* of first oil hole 31.

The angle formed by first oil hole 31 and second oil hole 32 intersecting each other is larger than 90°. For example, inclination angle θ of first oil hole 31 with divided surface 14 set as a reference is 10°, and when second oil hole 32 is orthogonal to divided surface 14, second oil hole 32 intersects first oil hole 31 at the angle of 100°. In this way, first oil hole 31 intersects second oil hole 32 at an obtuse angle, and consequently, the loss of flow of lubricating oil at the intersection becomes small.

First oil hole 31 and second oil hole 32 are each formed, for example, by secondary machining with a drill after forming lower link upper 6A by forging. In addition, although carburization treatment (carburization quench hardening) is conducted to lower link upper 6A for increasing surface hardness, it is desirable to perform drilling before the carburization treatment.

Here, in one preferable embodiment, the diameter of second oil hole 32 is set to be larger than that of first oil hole 31. In this way, when second oil hole 32 is formed so as to have a larger diameter, the rigidity around second oil hole 32 is lowered, and a relatively large deformation occurs, as a result of which stress around first oil hole 31 (in particular, around oil inlet 31*b* of first oil hole 31) where stress concentration as the largest problem arises is lowered. That is, as compared with case where the diameter of first oil hole 31 is the same as that of second oil hole 32, or case where the diameter of first oil hole 31 is smaller than that of second oil hole 32, stress at oil inlet 31*b* is alleviated.

In addition, by setting the diameter of second oil hole 32 so as to be larger than that of first oil hole 31, even if there is some machining error or tolerance, a communication state at the intersecting portion therebetween can be surely secured, and a predetermined passage sectional area can be stably obtained.

In addition, in the illustrated example, although distal end 32*a* of second oil hole 32 passes through and slightly extends from first oil hole 31 further due to drilling, such an excess passage part is not necessary if working can be performed.

In lower link 6 of the embodiment configured as above, at a predetermined crank angle, oil supply hole 29 on the crank pin 5 side meets oil inlet 31*b* of first oil hole 31, and, as oil jet, pressurized lubricating oil is injected from oil outlet 32*b* toward upper pin 4 through first oil hole 31 and second oil hole 32. By this oil jet, lubrication is performed between upper pin 4 and upper link 3.

Here, since inclination angle θ of first oil hole 31 with respect to divided surface 14 is relatively small and oil inlet 31*b* is opened at a position close to divided surface 14, the stress concentration at the opening edge of oil inlet 31*b* is alleviated. For example, when an oil hole was linearly formed penetrating in a direction intersecting upper pin 4 along the radial line of crank pin bearing portion 11, assuming that the positions of upper pin 4 and the like are the same as those shown in FIG. 4, inclination angle θ with respect to divided surface 14 would be approximately 40°. In this angle direction, the oil hole passes through an area where stress is high in the stress distribution in the circumferential direction of crank pin bearing portion 11. In contrast to this, in the above embodiment, by forming oil hole 30 from first oil hole 31 and second oil hole 32, oil inlet 31*b* is located at a position close to divided surface 14, and it is advantages in suppressing stress concentration.

Here, when, as mentioned above, inclination angle θ of first oil hole 31 with divided surface 14 set as a reference is small, the circumferential velocity of oil inlet 31*b* with respect to crank pin 5 becomes high during the swinging movement of lower link 6 and rotation movement of crank pin 5 (as compared with case where inclination angle θ is, for example, approximately 40°). Consequently, the time during which oil supply hole 29 on the crank pin 5 side meets oil inlet 31*b* becomes relatively short, and the amount of lubricating oil tends to decrease. Therefore, in one preferable embodiment, as shown in FIG. 5, a communicating hole 41 of bearing metal 16 is formed in a long hole shape which is circumferentially long.

That is, bearing metal 16 is formed by being divided into two parts by 180° so as to have a cylindrical shape as a whole, and they are assembled to respective lower link upper 6A and lower link lower 6B in a non-rotation state. Bearing metal 16 is formed with communicating hole 41 located at a position corresponding to inlet 31*b*, in order to communicate oil supply hole 29 on the crank pin 5 side and oil inlet 31*b* of lower link 6 with each other. In addition, communicating hole 41 has a long hole shape extending in the circumferential direction. Accordingly, oil supply hole 29 on the crank pin 5 side and oil inlet 31*b* of lower link 6 are kept in a communication state over a predetermined angle range. In other words, the time during which oil supply hole 29 on the crank pin 5 side and oil hole 31*b* of lower link 6 communicate with each other becomes long. Consequently, a sufficient amount of lubricating oil can be secured.

In one embodiment, as shown in FIG. 6, one end of communicating hole 41 having a long hole shape is located at a position corresponding to oil inlet 31*b*, and the other end extends to a position at which inclination angle θ with divided surface 14 set as a reference becomes larger.

In addition, when communicating hole 41 is excessively enlarged, surface pressure as a bearing becomes high, and it is therefore not preferable.

Figure 7:
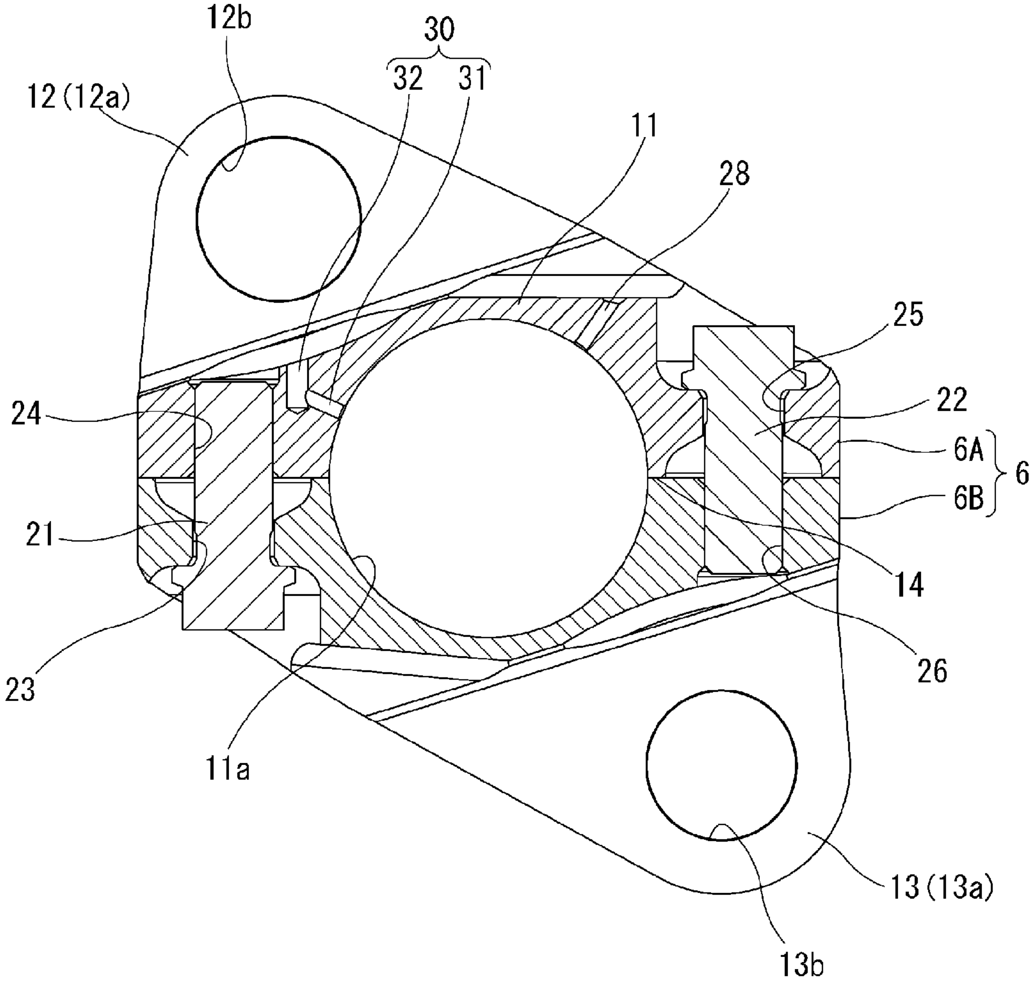
FIG. 7 is a sectional view of the lower link in a second embodiment.
Figure 8:
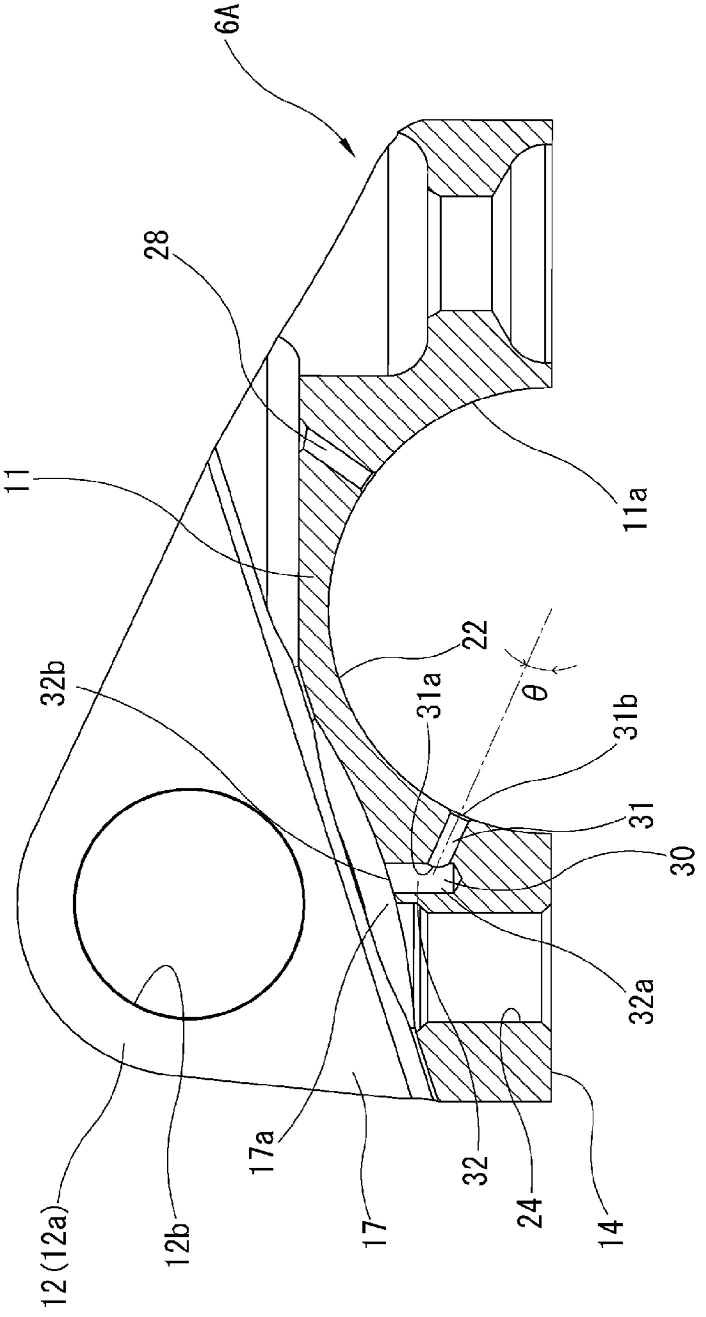
FIG. 8 is a sectional view of the lower link upper in the second embodiment.
Figure 9:
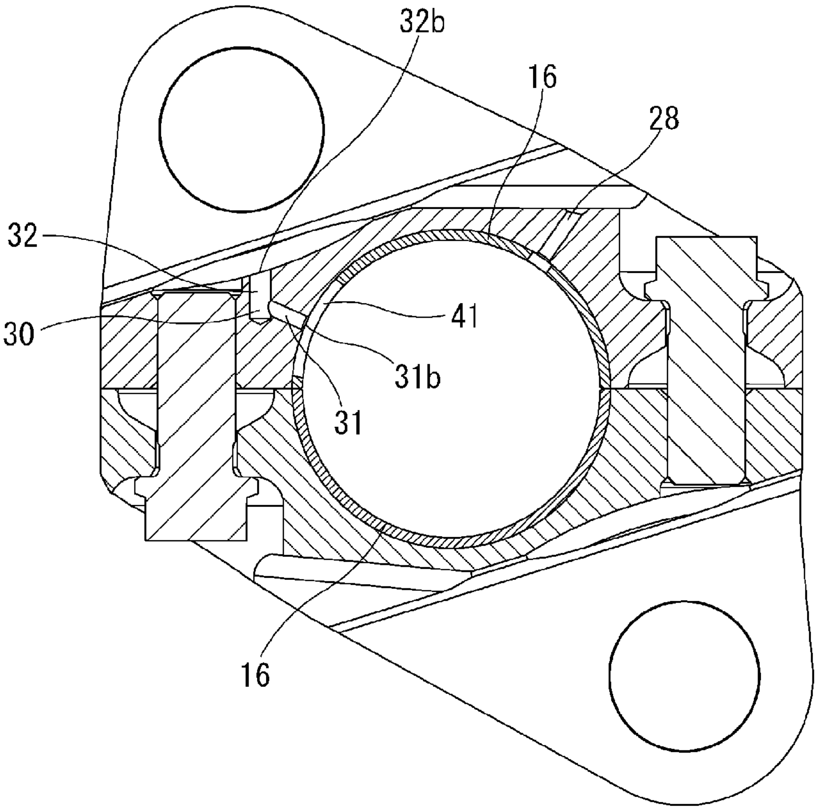
FIG. 9 is a sectional view of the lower link in the second embodiment in which the bearing metal is incorporated.

Although, as an example, first embodiment in which inclination angle θ of first oil hole 31 with divided surface 14 set as a reference is 10° has been explained, in the present invention, inclination angle θ of first oil hole 31 is not limited to a specific angle. FIG. 7 to FIG. 9 show lower link 6 in a second embodiment in which inclination angle θ of first oil hole 31 along the radial line of crank pin bearing portion 11 is set, for example, to 24°. Other configurations are basically the same as those of the first embodiment. First oil hole 31 is also formed such that the extension line of the center line of first oil hole 31 is directed in a direction not intersecting upper pin 4, and lubricating oil is guided toward the upper pin 4 side via second oil hole 32.

In the second embodiment, the intersecting angle at the intersection portion between first oil hole 31 and second oil hole 32 is larger than that of the first embodiment, and pressure loss caused by a change in a flow direction is small. In addition, the passage length of second oil hole 32 becomes shorter than that in the first embodiment, as a result of which pressure loss also becomes small. However, oil inlet 31*b* of first oil hole 31 is positioned close to the area where stress is high. It is therefore preferable to set inclination angle θ while considering these matters.

In the second embodiment, although communicating hole 41 of bearing metal 16 is also formed in a long hole shape, inclination angle θ of first oil hole 31 is large as compared with the first embodiment, and oil inlet 31*b* of first oil hole 31 is positioned in the vicinity of the middle in the circumferential direction of communicating hole 41 having a long hole shape (see FIG. 9).

In addition, lower link upper 6A (lower link 6) of the first embodiment and the second embodiment is provided with, in addition to oil hole 30, an oil hole 28 for supplying oil jet toward piston 1 (see FIG. 1) or the inner wall surface of a cylinder. Oil hole 28 is positioned closer to control pin 9 than the position at which the maximum combustion load reaction in the circumference of crank pin bearing portion 11 acts. Consequently, the stress concentration at the opening edge of oil hole 28 by the combustion load and combustion load reaction mentioned above is relatively small. Oil hole 28 is therefore formed so as to simply extend linearly. An communicating hole 42 of bearing metal 16 which corresponds to oil hole 28 is formed in a true circle (see FIG. 5, FIG. 6 and FIG. 9).

As the above, although one embodiment of the present invention has been explained in detail, the present invention is not limited to the above embodiments, and various changes can be made to the embodiments. For example, although, in the above embodiments, first oil hole 31 is formed along the radial line of crank pin bearing portion 11, it may be slightly inclined with respect to the radial line of crank pin bearing portion 11 or may be arranged so as to be slightly displaced in parallel with respect to the radial line.

In addition, second oil hole 32 may not be accurately arranged along the direction orthogonal to divided surface 14 (that is, the direction parallel to bolt 21).

The invention claimed is:

1. A lower link of an internal combustion engine which composes a piston crank mechanism of the internal combustion engine, the piston crank mechanism including: an upper link having one end connected to a piston of the internal combustion engine via a piston pin; the lower link connected to an other end of the upper link via an upper pin, and connected to a crank pin of a crankshaft; and a control link having one end swingably supported on an engine body side, and an other end connected to the lower link via a control pin, the lower link comprising: a crank pin bearing portion rotatably fitted to the crank pin between the upper pin and the control pin, wherein an oil hole for supplying lubricating oil from an oil supply hole of the crank pin toward a connecting portion between the upper pin and the upper link is formed through the crank pin bearing portion, wherein the oil hole includes: a first oil hole linearly extending from an inner peripheral surface of the crank pin bearing portion outwardly in a radial direction; and a second oil hole linearly extending so as to intersect a distal end portion of the first oil hole, and having one end opened to an outer surface of the lower link as an oil outlet, wherein an intersecting angle between the first oil hole and the second oil hole is larger than 90°.

2. The lower link of the internal combustion engine according to claim 1, wherein a diameter of the second oil hole is larger than that of the first oil hole.

3. The lower link of the internal combustion engine according to claim 1, wherein the lower link is divided into two parts of a lower link upper including an upper-pin pin boss portion and a lower link lower including a control-pin pin boss portion, at a divided surface passing through a center of the crank pin, and these two parts are fastened to each other by a plurality of bolts extending in a direction orthogonal to the divided surface, wherein the first oil hole extends in a direction obliquely inclined with respect to the divided surface, and wherein the second oil hole extends in a direction orthogonal to the divided surface.

4. The lower link of the internal combustion engine according to claim 1, wherein the first oil hole is formed such that an extension line of a center line of the first oil hole extends in a direction not intersecting an outer peripheral surface of the upper pin, and wherein the second oil hole is formed such that an extension line of a center line of the second oil hole extends in a direction intersecting the outer peripheral surface of the upper pin.

5. The lower link of the internal combustion engine according to claim 1, wherein the first oil hole is formed along a radial line of the crank pin bearing portion.

6. The lower link of the internal combustion engine according to claim 1, wherein the crank pin bearing portion is fitted to the crank pin via a bearing metal, and wherein the bearing metal is formed with a long-hole-shaped communicating hole opened thereto such that the oil supply hole of the crank pin and the first oil hole are kept in a communication state with each other over a predetermined angle range.

* * * * *